Jan. 1, 1952            E. H. WENZEL            2,580,629

COMBINED WATER SPRAY AND CHEMICAL DISPENSER

Original Filed June 24, 1948            2 SHEETS—SHEET 1

Inventor
Edwin H. Wenzel
By Ira Mutton James
Attorney

Jan. 1, 1952          E. H. WENZEL          2,580,629
COMBINED WATER SPRAY AND CHEMICAL DISPENSER
Original Filed June 24, 1948          2 SHEETS—SHEET 2
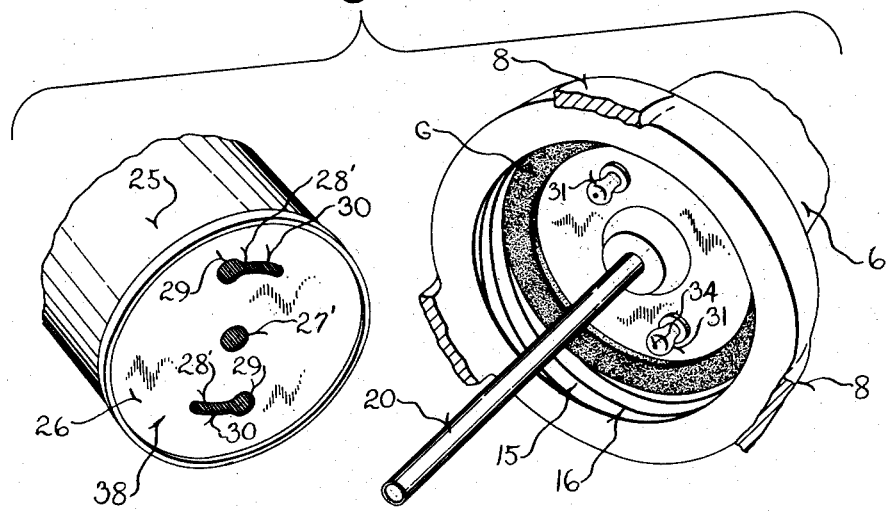
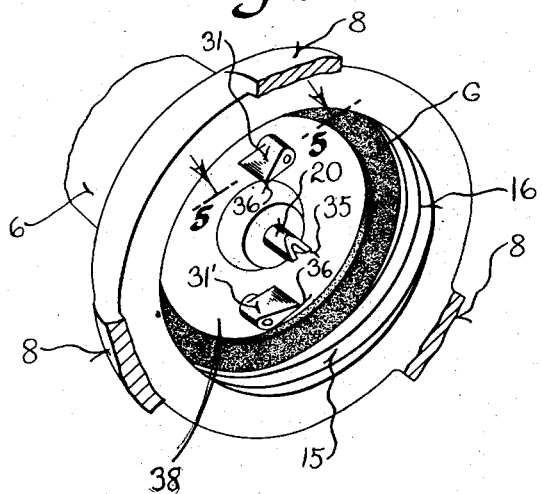
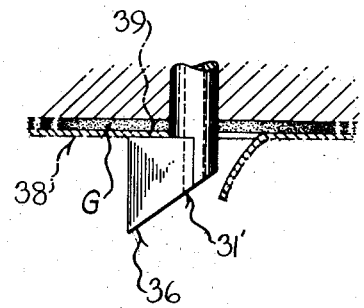

Patented Jan. 1, 1952

2,580,629

UNITED STATES PATENT OFFICE 2,580,629

COMBINED WATER SPRAY AND CHEMICAL DISPENSER

Edwin H. Wenzel, Milwaukee, Wis.

Continuation of application Serial No. 34,914, June 24, 1948. This application May 21, 1951, Serial No. 227,292

6 Claims. (Cl. 299—84)

1

This invention relates to water spray devices of the type used for spraying water upon lawns and gardens and the like, and has for its main object the provision of a water spray device capable of spraying chemical fertilizing and/or weed killing solutions upon lawns and gardens; and the instant application is a continuation of the copending, abandoned application, Serial No. 34,914, filed June 24, 1948.

More specifically it is an object of this invention to provide a combined water spray and chemical dispenser wherein chemical solution is drawn from a container attached to the device, by eductor action and caused to admix with water discharging from the spray device for dispersal of such chemicals in diminishing concentration upon a lawn or garden.

Another object of this invention is to provide a simple expedient for quickly and easily connecting a can containing the chemical to be dispensed to the body of the spray device, which means has a part thereof arranged to provide a nozzle for directing a stream of water from the spray device down into the can to impinge the contents thereof and agitate the same.

A further object of this invention resides in the provision of a novel container for the chemical material to be dispensed, the top wall of which is provided with means facilitating the connection of the container to the body of the spray device.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 3 is a perspective view showing the container of Figure 2 about to be attached to the underside of the spray device;

Figure 4 is a view looking at the underside of the body of the spray device and illustrating another embodiment of the invention; and Figure 5 is a cross sectional view taken along the plane of the line 5—5 of Figure 4.

2

Figure 1:
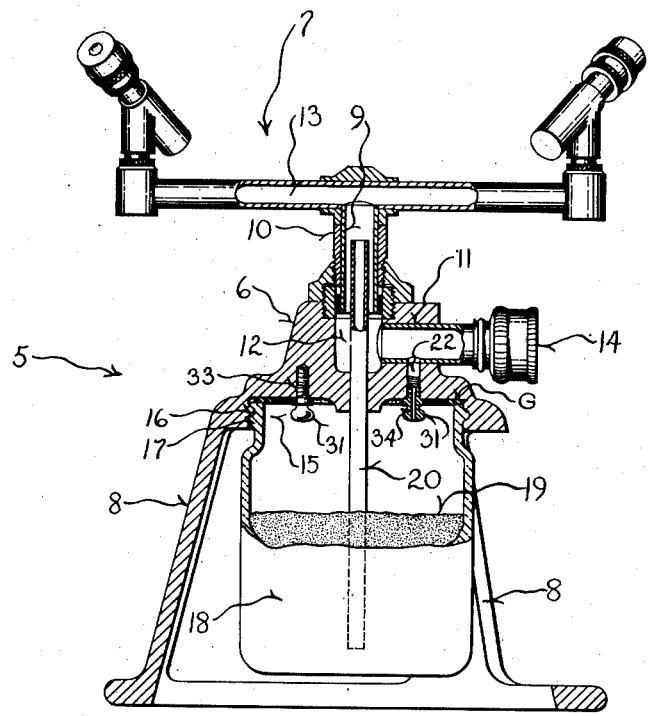
Figure 1 is a side view of the combined water spray and chemical dispenser of this invention, part of the device being shown in elevation and part in section.

Referring now more particularly to the accompanying drawings in which like numerals indicate like parts, the numeral 5 generally designates the combined water spray and chemical dispensing unit of this invention. It comprises an upright body 6 having a spray head 7 mounted thereon, and the body is supported at an elevation above the ground by a plurality of spaced apart legs 8.

The spray head 7 is of the rotatable type adapted to be driven by the force of water discharging therefrom, and for this purpose has a downwardly projecting sleeve 9 received in an upright nipple 10 projecting upwardly from the top of the body to mount the spray head for rotation on a vertical axis.

The specific details of construction of the body and particularly the spray head form no part of this invention, and it is important only to note that the dispenser body has a side inlet passage 11 therein communicating with an upright outlet passage 12 the upper end of which leads into the discharge passage 13 of the spray head. A suitable nipple carrying a coupling 14 at its outer end provides for attachment of the spray device to a source of water under pressure.

For the purposes of this invention, the body 6 of the spray device is provided with a well 15 opening to its underside, coaxially of the outlet passage 12 of the body. The side wall of the well has internal screw threads 16 thereon which are cooperable with the threads 17 on the neck of a glass receptacle 18 similar to a Mason jar to enable the jar to be readily attached to the underside of the body as shown best in Figure 1. The open end of the jar 18 is adapted to seat against the bottom of the well 15, and to guard against leakage, a gasket G is preferably interposed between the rim of the threaded neck and the bottom of the well.

The jar 18 is adapted to contain a quantity of chemical 19 which may be any one of a number of well-known commercial fertilizing agents. The fertilizer may be either in concentrated liquid form or in the form of water soluble granules as shown in Figure 1.

In either event the contents of the jar 18 is adapted to be drawn from the jar into the body of the spray device through a tube 20 by eductor action. The tube is rigidly carried by the body and has its lower end projecting from the underside of the body centrally of the well 15 and into the jar 18. The upper end of the tube opens into the outlet passage 12 of the body near the junction of said passage with the discharge passage 13 of the dispersing head 7. Consequently, when water flows upwardly through the passage 12 and into the dispersing head, the eductive force of the water flowing through the outlet passage 12 and acting on the eductor tube 20 is utilized to draw the chemical from the jar 18 into the passage 12 for admixture with the water about to enter the dispersing head.

In order to facilitate eduction of the contents of the jar, water is supplied to the interior of the jar through a restricted passage 22 communicating with the water inlet passage 11 and opening into the well 15 at the underside of the body at an area encircled by the threaded neck of the jar.

Hence, when the spray device is connected with a source of water under pressure, some of the water will flow into the jar 18 to stir up and dissolve the granular fertilizing material therein; and the resulting solution will be drawn up into the outlet passage 12 through the tube 20 by the eductive force of the water flowing through the body. The solution thus educted into the outlet passage 12 is, of course, further mixed with the water flowing into the dispersing head and discharged by the head onto the lawn or garden to be fertilized.

It will be apparent from the description thus far, that in the operation of the device the fertilizing solution formed within the jar 18 will be educted in diminishing concentration from the jar and sprayed upon the lawn or garden to be fertilized. After the contents of the jar has been emptied, however, spraying with clear water is preferably continued to wash the fertilizer off the grass or the leaves of garden plants, and to soak the same into the ground to thus avoid burning of the lawn and/or garden plants.

While the screw threads 16 formed on the side wall of the well 15 readily provide for the attachment of containers having an opening leading through a threaded neck on the container, provision is also made for the attachment of a metal container to the body of the device while at the same time affording the necessary communication between the eductor tube 20 and the interior of the metal container as well as for introducing water into the interior of the container for dissolving the granular fertilizer material therein.

Figure 2:
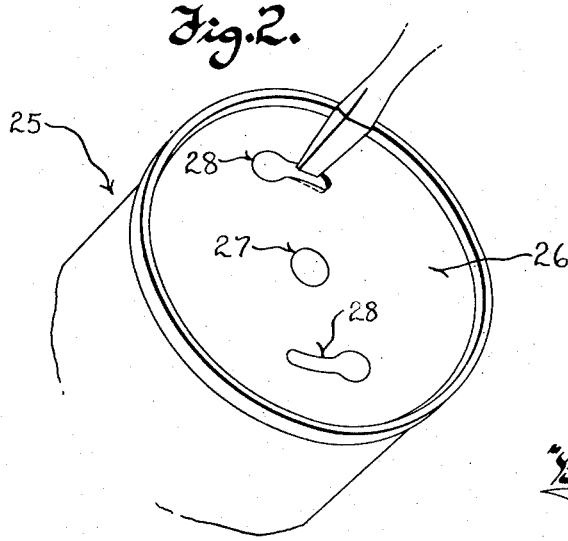
Figure 2 is a fragmentary perspective view illustrating one form of chemical container which may be readily attached to the body of the spray device in position to have the contents of the container educted therefrom.

One such metal container 25 is partially illustrated in Figures 2 and 3, and it may either be made of relatively stiff carboard or entirely of metal, but in either event the container is provided with a metallic top wall 26 having a diameter such as to fit the well 15 on the underside of the body of the spray device. The top wall 26 of the container has scoring 27 at its center arranged in a circle and which is adapted to provide a central hole 27' to receive the eductor tube 20 when the portion of the top wall encircled by the scoring 27 is punched inwardly.

The top wall 26 also has two other scored areas 28 at opposite sides of the central scoring 27, and the scoring 28 is adapted to be punched in to provide a pair of keyhole shaped slots 28' concentric to the central aperture 27' of the container.

The large end 29 of each of the slots 28', as seen best in Figure 3, is of a size to readily receive the heads of button-like projections 31 in the bottom of the counterbore. The projections 31 are diametrically opposite one another and are spaced from the central eductor tube 20 a distance corresponding to the spacing of the slots 28' from the central aperture 27' of the container, so that when the upper end of the container is inserted into the well 15 with the eductor tube 20 projecting through the central aperture 27' of the container, each of the heads of the button-like projections 31 will pass through one of the enlarged ends 29 of the slots 28' in the top wall of the container. With the container properly seated in the well 15 in this manner, it is only necessary to rotate the container slightly to engage the heads of the button-like projections 31 under the narrow ends of the slots 28' remote from the enlargements 29 thereof. This establishes a secure leakproof connection between the container and the underside of the dispenser since in engaging the heads of the projections under the edges of the slots the top of the container is clamped firmly against the gasket G.

It is important to note that the button-like projections 31 are undercut so as to prevent longitudinal motion of the container out of the well 15, and that the projections are formed on the outer ends of studs 33 threaded into apertures leading into the body of the spray device from the bottom of the well 15. Also each of the studs has a small diameter longitudinal hole 34 leading entirely therethrough, one of which communicates with the passage 22 leading into the inlet passage 11 of the spray device so that the water introduced into the container flows through the passage 22 and the hole 34.

The operation of the combined water spray and fertilizing dispenser is the same, of course, whether the container is of metal as described, or is a glass jar as in the previous embodiment. The metal container has the advantage, however, of enabling hermetic sealing to assure against deterioration of its contents.

A further feature of this invention resides in the provision of knife edges 35 on the lower or inlet end of the eductor tube 20 and similar knife edges 36 upon the undersides of the heads 31' of slightly modified projections located in the bottom of the well 15, as seen in Figures 4 and 5. The knife edges 35 and 36 enable perforation of the unscored top wall of any suitable type of can in which the fertilizer is packaged merely by pressing the upper end of the can into the well 15. The perforation of the unscored top wall of a can in this manner also establishes communication between the eductor tube and water passage 22 with the interior of the can.

In this case also, a bayonet-joint connection is estblished between the heads 31' of the projections and the top wall 38 of the container perforated by the knife edges on the projections merely by rotation of the container a slight distance relative to the body of the spray device.

This joint is illustrated in Figure 5, where it will be seen that rotation of the container relative to the body of the spray device carries an uncut portion 39 of the top wall of the container under the head 31' of the projection to releasably lock the container in an operative position on the body of the device.

From the foregoing description taken in connection with the accompanying drawings, it will be readily apparent to those skilled in the art that this invention greatly simplifies the application of fertilizer to lawns and gardens by reason of the fact that dispensing of the fertilizer is effected in consequence to the spraying of water upon the lawn or garden to be fertilized, thus preventing the damaging effects brought about by the contact of concentrated fertilizing material with delicate garden plants.

It will also be appreciated that while the spray device of this invention is specially well suited for the dispensing of fertilizing agents upon lawns or gardens, the device may also be used for the dispensing and dispersal of fire extinguishing chemicals, some of which are presently available

What I claim as my invention is:

1. A combined water spray and chemical dispenser comprising: a body having an inlet passage and a substantially upright outlet passage communicating with said inlet passage; a dispersing head mounted on said body and having a water discharge passage communicating with the outlet passage of the body; legs connected with the body for supporting the same at an elevation above the ground; means on the body at the underside thereof providing for attachment of a receptacle to the body, between the legs, with the mouth of said receptacle seated against a flat surface on the underside of the body and closed thereby; means on the body defining a restricted passage opening to the underside of the body and communicating with one of said body passages to enable introduction of water into a receptacle connected to the body; an upright duct carried by the body with its lower end projecting downwardly from the underside of the body to be immersed in solution within the receptacle, and with the upper end of the duct so communicated with the outlet passage of the body that the eductive force of water flowing through said outlet passage to the dispersing head is utilized to draw solution from the receptacle through the duct and into the outlet passage of the body for admixture with the water flowing from the body into the dispersing head; and a pair of button-like elements connected with the underside of the body by reduced neck portions and engageable in keyhole shaped slots in the top of a metal container to hold such container connected with the body.

2. The combined water spray and chemical dispenser set forth in claim 1 wherein one of said button-like elements has a restricted passage leading therethrough to communicate the water inlet passage of the body with the interior of a metal can connected with the underside of the body, for introducing water into the can for admixture with chemicals therein.

3. A combined water spray and chemical dispenser comprising: a body having a water inlet passage and an upwardly extending outlet passage communicating with said inlet passage; a plurality of legs connected with the body and extending downwardly therefrom to support the body at an elevation above the ground, said body having a well in its underside coaxial with the outlet passage of the body; a pair of button-like projections fixed to the body in the bottom of said well and adapted to be received in slots in the top wall of a metal can inserted into the well, one of said button-like projections having a restricted passage leading therethrough and communicating with one of the body passages so as to provide for the introduction of water into a can connected with the body; and means defining an upright duct in the body coaxially of said outlet passage thereof with the lower end of the duct opening to the underside of the body to communicate with liquid in a can connected thereto, and with the upper end of the duct opening into said outlet passage in a manner such that the eductive force of water flowing upwardly through said outlet passage may be utilized to draw liquid up through the duct from the can and into said outlet passage for admixture with water issuing from the body.

4. The combined water spray and chemical dispenser set forth in claim 3 wherein the lower end of said duct projects below the underside of the body on said button-like projections and the lower end of said duct has knife edges formed thereon adapted to puncture the top wall of a metal can pressed up into said well in the body to enable attachment of an imperforate can to the body.

5. In combination: means connectible with a source of water under pressure, said means comprising a body having a duct therein; an eductor tube having its inlet end projecting from said body and its outlet end debouching into said duct; button-like projections on the body adjacent to the projecting end of said eductor tube; and a sealed container having a top wall scored to form keyhole shaped slots cooperable with said button-like projections to provide a detachable bayonet joint connection between the container and the body when the portions of said top wall encircled by said scorings are pushed in, and to form an aperture through which the inlet end of the eductor tube may enter the container.

6. A lawn treating device, comprising: a hollow body having an inlet connectible with a source of water under pressure and an outlet for treated water; means in the interior of the body defining an eductor passage having a mouth opening through the bottom of the body; undercut fastening elements projecting from the bottom of the body to enter holes formed in the top of a can containing the treating material and cooperable with the edges of said holes to provide a detachable bayonet joint connection between the body and the can, said fastening elements being spaced from one another and from the mouth of the eductor passage; sealing means on the bottom of the body encircling said fastening means and the mouth of the eductor passage, said sealing means being engageable with the top of a can connected with the body by said fastening elements and cooperable therewith to establish a watertight joint between the can and the body; and means defining an orifice communicating with the interior of the body near the inlet thereof and passing downwardly through one of the undercut fastening elements, said fastening element providing a nozzle for forcefully directing a fine stream of water from the body into a can connected to the body, to impinge the contents of the can and violently agitate the resulting solution whereby the solution can be drawn into said eductor passage through a hole in the top of the can.

EDWIN H. WENZEL.

REFERENCES CITED

The following references are of record in the file of this patent:

UNITED STATES PATENTS

| Number | Name | Date |
| --- | --- | --- |
| 560,922 | Pearson | May 26, 1896 |
| 1,082,141 | Sites | Dec. 23, 1913 |
| 1,740,373 | Shaukis | Dec. 17, 1929 |
| 1,847,406 | McArdle | Mar. 1, 1932 |
| 2,034,660 | Lohse | Mar. 17, 1936 |
| 2,063,131 | Siems | Dec. 8, 1936 |
| 2,131,796 | Day | Oct. 4, 1938 |
| 2,176,898 | Fried | Oct. 24, 1939 |
| 2,304,846 | Pinkerton | Dec. 15, 1942 |
| 2,335,281 | Jepson | Nov. 30, 1943 |
| 2,361,705 | Patterson | Oct. 31, 1944 |
| 2,367,300 | McManus | Jan. 16, 1945 |